United States Patent
Naserian et al.

(10) Patent No.: US 11,875,611 B2
(45) Date of Patent: Jan. 16, 2024

(54) REMOTE OBSERVATION AND REPORTING OF VEHICLE OPERATING CONDITION VIA V2X COMMUNICATION

(71) Applicant: GM GLOBAL TECHNOLOGY OPERATIONS LLC, Detroit, MI (US)

(72) Inventors: Mohammad Naserian, Windsor (CA); Paul E. Krajewski, Troy, MI (US); Fan Bai, Ann Arbor, MI (US); Abby Szafranski, Troy, MI (US); Donald K. Grimm, Utica, MI (US); Craig A. Kollar, Sterling Hts, MI (US); Bryan Quintanilla, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 240 days.

(21) Appl. No.: 17/392,480

(22) Filed: Aug. 3, 2021

(65) Prior Publication Data
US 2023/0045241 A1    Feb. 9, 2023

(51) Int. Cl.
*G07C 5/00*    (2006.01)
*H04W 4/40*    (2018.01)

(52) U.S. Cl.
CPC ............ *G07C 5/008* (2013.01); *G07C 5/006* (2013.01); *H04W 4/40* (2018.02)

(58) Field of Classification Search
CPC .......... G07C 5/008; G07C 5/006; H04W 4/40
USPC ....................................................... 701/31.4
See application file for complete search history.

(56) References Cited

U.S. PATENT DOCUMENTS

| | | | |
|---|---|---|---|
| 10,156,848 B1 * | 12/2018 | Konrardy | B60W 10/20 |
| 10,386,845 B1 * | 8/2019 | Konrardy | G07C 5/0841 |
| 10,676,097 B1 * | 6/2020 | Goldfarb | G08G 1/0112 |
| 10,853,936 B2 * | 12/2020 | Oe | G08G 1/0112 |
| 2009/0268947 A1 * | 10/2009 | Schaufler | G06V 20/58 |
| | | | 382/104 |
| 2011/0190972 A1 * | 8/2011 | Timmons | G08G 1/167 |
| | | | 701/31.4 |
| 2016/0280132 A1 * | 9/2016 | Palanimuthu | G08G 1/163 |
| 2016/0343254 A1 * | 11/2016 | Rovik | G08G 1/096716 |
| 2017/0084175 A1 * | 3/2017 | Sedlik | G08G 1/096741 |
| 2018/0304807 A1 * | 10/2018 | Boesch | G06V 20/584 |
| 2019/0164267 A1 * | 5/2019 | Oe | G08G 1/0133 |
| 2019/0279447 A1 * | 9/2019 | Ricci | A61B 5/4809 |
| 2019/0387558 A1 * | 12/2019 | Cao | H04W 12/50 |
| 2020/0043348 A1 * | 2/2020 | Ghosh | G01C 21/005 |
| 2020/0284607 A1 * | 9/2020 | Mangal | G06V 20/584 |
| 2020/0394918 A1 * | 12/2020 | Chen | G01C 21/3811 |

(Continued)

*Primary Examiner* — Logan M Kraft
*Assistant Examiner* — John D Bailey
(74) *Attorney, Agent, or Firm* — CANTOR COLBURN LLP

(57) ABSTRACT

According to one or more examples, a system includes an observer vehicle, and a vehicle in a predetermined vicinity of the observer vehicle. The observer vehicle detects an operating condition of the vehicle using one or more perception devices. The observer vehicle determines that the operating condition does not satisfy a predetermined norm. The observer vehicle generates a message indicating the operating condition of the vehicle. The observer vehicle identifies a communication identifier of the vehicle. The observer vehicle sends the message to be received by the vehicle using the communication identifier via a vehicle to everything (V2X) communication module.

15 Claims, 5 Drawing Sheets

(56) References Cited

U.S. PATENT DOCUMENTS

2021/0031763 A1\* 2/2021 Takaki .................... H04W 4/44
2021/0101612 A1\* 4/2021 Hall ........................ H04W 4/38
2021/0377795 A1\* 12/2021 Guo ................. H04W 28/0289
2021/0409379 A1\* 12/2021 Hwang .................. G06V 10/25
2022/0067020 A1\* 3/2022 Pandey ................ G05D 1/0088
2022/0114433 A1\* 4/2022 Lu ......................... G08G 1/165

\* cited by examiner

REMOTE OBSERVATION AND REPORTING OF VEHICLE OPERATING CONDITION VIA V2X COMMUNICATION

INTRODUCTION

The present disclosure relates to telecommunication technology, and particularly systems, storage media, and methods for remote observation and reporting of vehicle module malfunction via Vehicle-to-everything (V2X) communication.

Wireless communication systems are widely deployed to provide telecommunication services such as telephony, media, navigation, messaging, broadcasts, etc. In the field of transportation, such wireless communication systems can facilitate connected vehicles, which generally encompass vehicle-to-vehicle (V2V), vehicle-to-infrastructure (V2I), and vehicle-to-pedestrian (V2P) communications, collectively known as "V2X." V2X technologies have the potential for significant transportation safety and mobility benefits, both on their own and as complementary technologies when combined with in-vehicle sensors supporting the integration of automated vehicles and other applications.

SUMMARY

According to one or more examples, a system includes an observer vehicle, and a vehicle in a predetermined vicinity of the observer vehicle. The observer vehicle detects an operating condition of the vehicle using one or more perception devices. The observer vehicle determines that the operating condition does not satisfy a predetermined norm. The observer vehicle generates a message indicating the operating condition of the vehicle. The observer vehicle identifies a communication identifier of the vehicle. The observer vehicle sends the message to be received by the vehicle using the communication identifier via a vehicle to everything (V2X) communication module.

In one or more examples, identifying the communication identifier of the vehicle comprises identifying the vehicle in a V2X space using a first vehicle vector associated with the vehicle, the first vehicle vector being in a perception space.

In one or more examples, the first vehicle vector comprises one or more parameters detected by the one or more perception devices.

In one or more examples, identifying the communication identifier of the vehicle further comprises computing a similarity score of the first vehicle vector with a second vehicle vector from the V2X space.

In one or more examples, the second vehicle vector comprises the one or more parameters received by the V2X communication module.

In one or more examples, the vehicle and the observer vehicle are headed in the same direction.

In one or more examples, the vehicle and the observer vehicle are headed in different directions.

In one or more examples, the operating condition is at least one from a group comprising a malfunctioning light, a misaligned wheel, a misaligned shock absorber, and an open door.

In one or more examples, the vehicle receives a plurality of messages respectively from a plurality of observer vehicles.

In one or more examples, the vehicle creates a synthesized message by aggregating the plurality of messages, the synthesized message comprising an intersection of one or more operating conditions included in the plurality of messages received.

In one or more examples, the vehicle compares the synthesized message with one or more outputs from a diagnostic module, and in response to the one or more operating conditions in the synthesized message being confirmed by the diagnostic module, providing a notification indicating the one or more operating conditions from the synthesized message.

According to one or more examples, a computer-implemented method includes detecting, by an observer vehicle, an operating condition of a vehicle using one or more perception devices in response to the vehicle being within a predetermined vicinity of the observer vehicle. The method further includes determining, by the observer vehicle, that the operating condition does not satisfy a predetermined norm. The method further includes generating, by the observer vehicle, a message indicating the operating condition of the vehicle. The method further includes identifying, by the observer vehicle, a communication identifier of the vehicle. The method further includes sending, by the observer vehicle, the message to be received by the vehicle using the communication identifier via a vehicle to everything (V2X) communication module.

In one or more examples, the operating condition is at least one from a group comprising a malfunctioning light, a misaligned wheel, a misaligned shock absorber, and an open door.

In one or more examples, identifying the communication identifier of the vehicle includes identifying the vehicle in a V2X space using a first vehicle vector associated with the vehicle, the first vehicle vector being in a perception space, and wherein the first vehicle vector comprises one or more parameters detected by the one or more perception devices. Further, identifying the communication identifier includes computing a similarity score of the first vehicle vector with a second vehicle vector from the V2X space, wherein the second vehicle vector comprises the one or more parameters received by the V2X communication module.

In one or more examples, the vehicle receives a plurality of messages respectively from a plurality of observer vehicles, and in response, the vehicle creates a synthesized message by aggregating the plurality of messages, the synthesized message comprising an intersection of one or more operating conditions included in the plurality of messages received.

In one or more examples, the vehicle compares the synthesized message with one or more outputs from a diagnostic module, and in response to the one or more operating conditions in the synthesized message being confirmed by the diagnostic module, the vehicle provides a notification indicating the one or more operating conditions from the synthesized message.

According to one or more examples, a vehicle includes one or more perception devices, a vehicle to everything (V2X) communication module, and a vehicle controller. The vehicle controller detects an operating condition of a first vehicle using the one or more perception devices. The vehicle controller determines that the operating condition does not satisfy a predetermined norm. The vehicle controller generates a message indicating the operating condition of the first vehicle. The vehicle controller identifies a communication identifier of the first vehicle. The vehicle controller sends the message to be received by the first vehicle using the communication identifier via the V2X communication module.

In one or more examples, identifying the communication identifier of the first vehicle includes identifying the first vehicle in a V2X space using a first vehicle vector associated with the first vehicle, the first vehicle vector being in a perception space, and wherein the first vehicle vector comprises one or more parameters detected by the one or more perception devices. Identifying the vehicle identifier further includes computing a similarity score of the first vehicle vector with a second vehicle vector from the V2X space, wherein the second vehicle vector comprises the one or more parameters received by the V2X communication module.

In one or more examples, the first vehicle receives a plurality of messages respectively from a plurality of vehicles, and the first vehicle creates a synthesized message by aggregating the plurality of messages, the synthesized message comprising an intersection of one or more operating conditions included in the plurality of messages received.

In one or more examples, the first vehicle compares the synthesized message with one or more outputs from a diagnostic module, and in response to the one or more operating conditions in the synthesized message being confirmed by the diagnostic module, the first vehicle provides a notification indicating the one or more operating conditions from the synthesized message.

The above features and advantages and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings.

DETAILED DESCRIPTION

Figure 1:
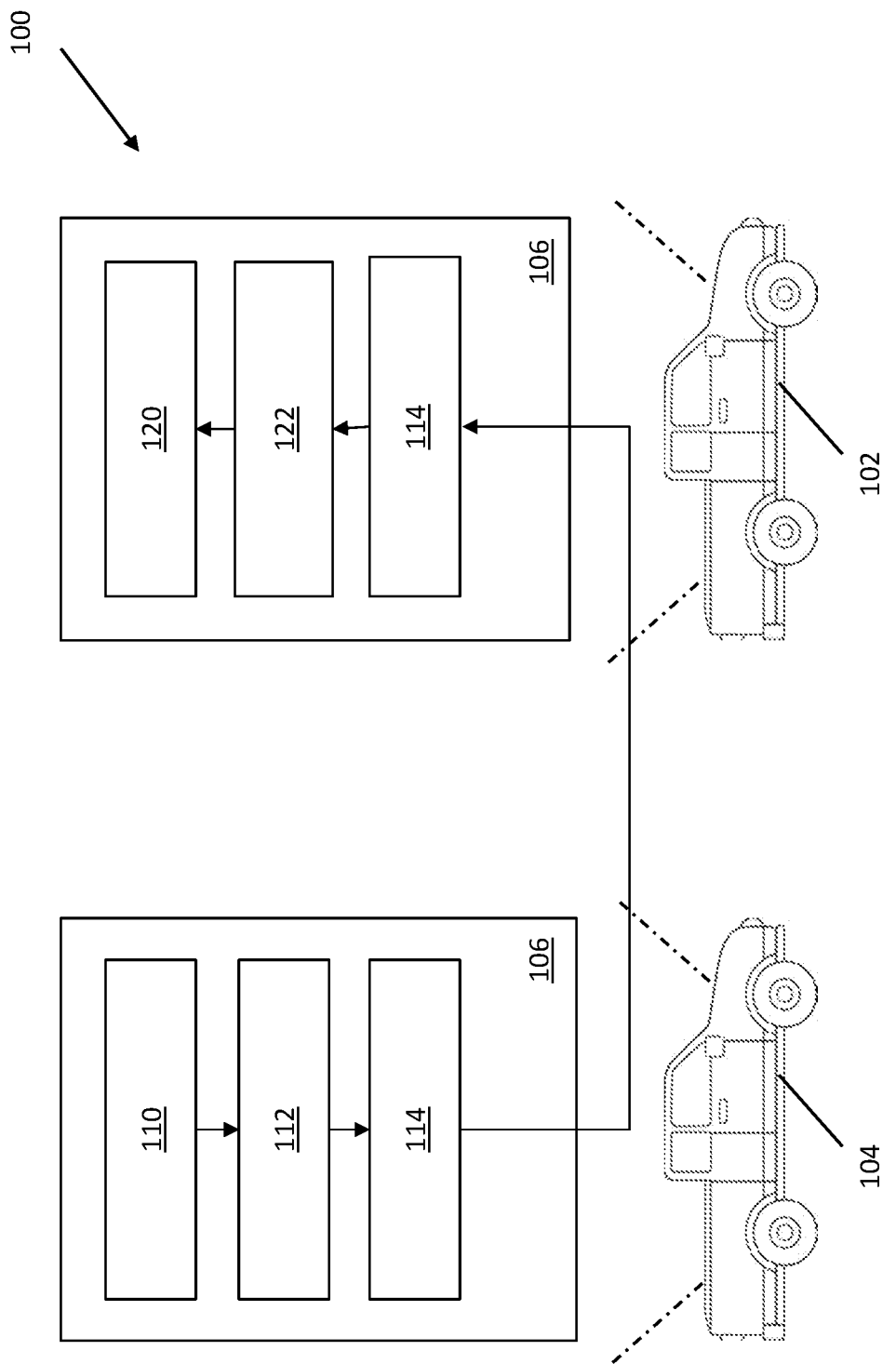
FIG. 1 illustrates a vehicle-to-everything (V2X) communication system according to one or more examples.

The following description is merely exemplary in nature and is not intended to limit the present disclosure, its application, or its uses. It should be understood that throughout the drawings, corresponding reference numerals indicate like or corresponding parts and features. As used herein, the term module refers to processing circuitry that may include an application-specific integrated circuit (ASIC), an electronic circuit, a processor (shared, dedicated, or group) and memory that executes one or more software or firmware programs, a combinational logic circuit, and/or other suitable components that provide the described functionality.

As used herein, the term "wireless communication" refers to electronic communication using any suitable wireless communication standards, such as NR, LTE-Advanced (LTE-A), LTE, Wideband Code Division Multiple Access (WCDMA), High-Speed Packet Access (HSPA), CDMA2000, and so on. Furthermore, the communication between network devices and between a network device and a terminal device in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, the NR communication protocols, and/or any other protocols either currently known or to be developed in the future.

Vehicles (e.g., cars, trucks, boats, bikes) might not be aware of an operating condition normally discovered by the annual vehicle examination process. Example operating condition can include rear lighting malfunction(s) (e.g., taillight, rear position light, stoplight, turn function lights, etc.), forward lighting malfunction(s) (e.g., front position, daytime running lights (DRL), low or high beam functions misfunction, etc.), misalignment of low and high beam functions, low tire pressure, shock absorber misalignment, wheel misalignment, open trunk, open door, or other such operating conditions that can be detected using an external visual inspection. The operating conditions and/or malfunctions can also be associated with a trailer or other types of objects towed by a vehicle. For example, the operating condition can include trailer stop, tail, or turn functions malfunctions, a loose item on a trailer, trailer item misalignment, etc. A technical challenge exists where such operating conditions or malfunctions are not detected by the vehicle (here, "vehicle" can refer to vehicle owner, vehicle operator, vehicle lessee, fleet operator, or other stakeholder).

The technical solutions described herein address such technical challenges. The technical solutions described herein facilitate a first vehicle ("observer") to detect one or more operating conditions of a second vehicle ("the vehicle") when the observer is in the vicinity (e.g., predetermined range) of the vehicle. Further, the observer can determine if any of the detected operating conditions are to be reported to the vehicle. The observer, in such cases, transmits a message to the vehicle via V2X communication. A further technical challenge, which is addressed by the technical solutions described herein, is for the observer to address the message to the vehicle. Another technical challenge addressed by the technical solutions herein is for the vehicle to trust and evaluate the message from the observer. It should be noted that the observer and the vehicle may not have any prior connection or reference with each other for the technical solutions herein to function. Rather, the observer and the vehicle are two vehicles that happen to pass by without knowing each other.

FIG. 1 illustrates a vehicle-to-everything (V2X) communication system 100 according to one or more examples. The V2X communication system 100 includes a vehicle 102 and an observer 104. It is understood that the example scenario depicted in FIG. 1 is not a restrictive example. For example, although vehicle 102 and the observer 104 are shown of the same make and model in FIG. 1, in other examples, the two can be of different makes and/or models. Further, although vehicle 102 and observer 104 are depicted to be headed in the same direction, in other examples, the two can be headed in different directions. Also, vehicle 102 and observer 104 may not be in the same lane. Additionally, vehicle 102 maybe a trailer or be towing a trailer in some examples.

Both, vehicle 102 and observer 104, include respective vehicle controllers 106. A vehicle controller 106 is a tangible computing system that includes one or more processing units, one or more memory devices, one or more storage devices, one or more communication modules, one or more input/output modules, etc. The vehicle controller 106 performs one or more methods in some examples. In one or more examples, the vehicle controller 106 performs the methods by executing computer-executable instructions stored in the memory or the storage devices. Alternatively, or in addition, the vehicle controller 106 performs the methods by using one or more hardware devices, such as integrated chips, field-programmable gate array, etc. Henceforth, it should be understood that vehicle 102 and its corresponding vehicle controller 106 can be used interchangeably; and observer 104 and its corresponding vehicle controller 106 can be used interchangeably.

Figure 2:
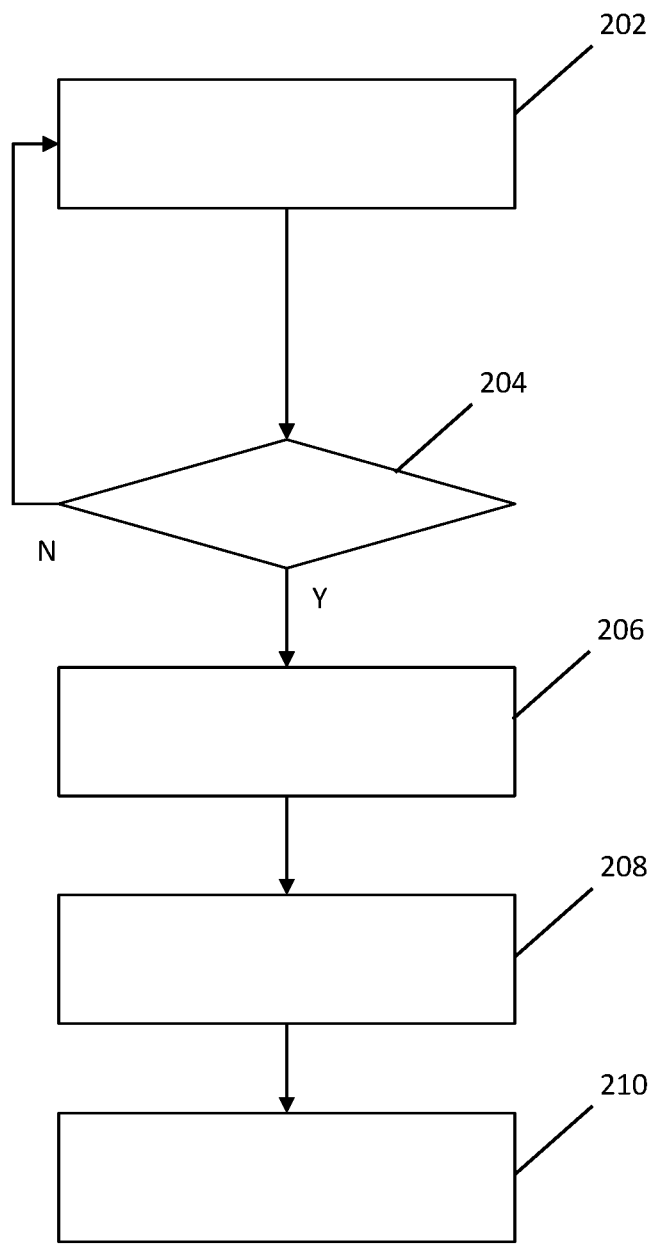
FIG. 2 depicts a flowchart of a method for remote observation and reporting of vehicle operating condition via V2X communication according to one or more examples.

FIG. 2 depicts a flowchart of a method 200 for remote observation and reporting of a vehicle operating condition via V2X communication according to one or more examples. In the example scenario of FIG. 1, method 200 facilitates observer 104 to perform remote observation of the vehicle 102 and report the observed operating condition to vehicle 102 via V2X communication. In some examples, observer 104 reports the operating conditions of several vehicles (102) respectively.

Method 200 includes, at block 202 observer 104 using perception devices 110 to detect operating conditions of the vehicle 102, which is in a predetermined vicinity of the observer 104. The perception devices 110 can include cameras, lidars, radars, sonars, photodetectors, and other such sensors. The predetermined vicinity of observer 104 can include a predetermined zone that is within a predetermined distance (e.g., 5 meters, 10 meters, etc.) from observer 104, and in a certain orientation(s) (e.g., front, front-left, front-right, etc.) of the observer 104.

At block 204, it is determined whether the observed operating condition of vehicle 102 is to be reported. Such a determination can include checking if any of the operating conditions do not satisfy predetermined norms of operation for vehicle 102. In one or more examples, observer 104 initially identifies a make and model of vehicle 102. Such identification can be performed using machine learning and/or another image (and/or other sensory data) classification techniques that are known or later developed. Further, observer 104 accesses a list of predetermined norms of vehicle 102 based on the identification.

Observer 104 compares the detected operating conditions of vehicle 102 with the predetermined norms. Such comparison can include checking the status of one or more lights of the vehicle 102 (e.g., brake lights, headlights, turn lights, spoiler lights, fog lights, etc.). The status of the lights can include detecting one or more malfunctioning bulbs, a misaligned bulb, a high beam, etc. Alternatively, or in addition, the comparison can include checking a tire tread of vehicle 102. Alternatively, or in addition, the comparison can include checking the alignment of one or more components (e.g., tires, shock absorber, etc.) of the vehicle 102. The comparison can also include checking the status of one or more doors of vehicle 102. In some cases, audible observations (e.g., engine noise, muffler noise, etc.) of the operating conditions can be compared. Observer 104 can check various other specifications of the operating conditions of vehicle 102 that can be detected using the perception devices 110.

If the operating conditions of vehicle 102 satisfy (i.e., are within specified thresholds) the specifications of vehicle 102, observer 104 continues without reporting the operating conditions. In one or more examples, observer 104 can monitor another vehicle (102) in its vicinity.

Alternatively, if observer 104 deems that one or more of the operating conditions do not meet the specifications of vehicle 102, observe 104 generates a message to report to vehicle 102, at block 206. The message includes one or more parameters. The parameters can include a description of the observation (e.g., driver-side headlight inoperative, passenger-side brake-light malfunctioning at bulb #10, tires misaligned, etc.). Alternatively, or in addition, the message can include an error code that identifies the observed operating condition. In one or more examples, the message can include an image, a video, audio, or other such identification of the operating condition. The message can also include a location where observer 104 captured the operating condition of vehicle 102. Additional information can be included in the message in other examples.

At block 208, observer 104 uses communication and visual association 112 to identify vehicle 102 from the perception (e.g., camera) space in the V2X (telecommunication) space. Here, "space" represents a collection of attributes. For example, the perception space of observer 104 can represent vehicle 102 as a vector of parameters that are detected by the perception devices 110. For example, Table 1 depicts vectors $W_X$ (each column) for different vehicles (102) in the vicinity of the observer 104.

TABLE 1

| Vehicle A' | Vehicle B' | Vehicle C' | ... |
|---|---|---|---|
| Perception Id | Perception Id | Perception Id | |
| Distance | Distance | Distance | |
| Angle | Angle | Angle | |
| Speed | Speed | Speed | |
| Color | Color | Color | |
| Make | Make | Make | |
| Model | Model | Model | |

Each vehicle 102 is assigned a unique perception identifier, distinguishing one vehicle from the other in the perception space. The perception devices 110 monitor and record the parameters for each vehicle 102, such as distance from the observer 104, angle in relation to the observer 104, speed, color, make, and model of the vehicle 102, etc. Accordingly, each vehicle in the vicinity, including vehicle 102, is represented as a vector in the perception space by observer 104. It is understood that Table 1 provides one possible example of representing the perception space and that in other examples, the perception space can be recorded in different manners.

Further, observer 104 represents each vehicle 102 as another vector in the V2X communication space. Table 2 provides an example representation of vehicles (102) as vectors in the V2X communication space. Consider that the vectors A', B', and C' in the perception space of Table 1, and the vectors A, B, and C from the V2X communication space in Table 2, respectively, belong to the same vehicles. In other words, the vector $V_A$ in Table 2 and the vector $W_{A'}$ are for the same vehicle; the vectors $V_B$ and $W_{B'}$ are for the same vehicle; and the vectors $V_C$ and $W_{C'}$ are for the same vehicle. The distance, angle, speed, color, and other such attributes in the V2X communication space are received from V2X broadcasts received by the observer 104. It is understood that Table 1 provides one possible example of representing the perception space and that in other examples, the perception space can be recorded in different manners.

TABLE 2

| Vehicle A | Vehicle B | Vehicle C | ... |
|---|---|---|---|
| V2X Id | Perception Id | Perception Id | |
| Distance | Distance | Distance | |
| Angle | Angle | Angle | |
| Speed | Speed | Speed | |
| Color | Color | Color | |

Figure 3:
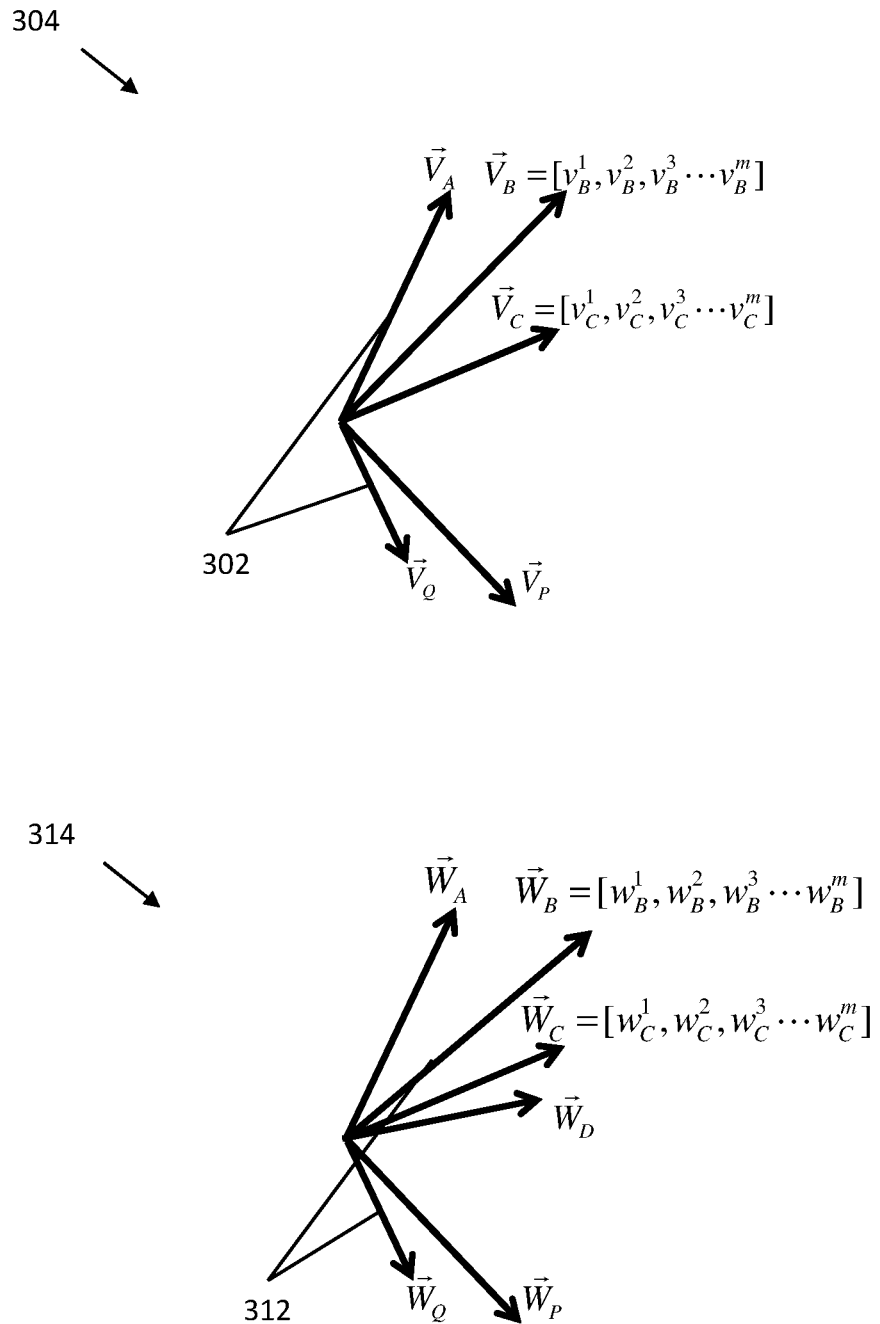
FIG. 3 depicts vector representation of various vehicles in the perception space and the V2X communication space according to one or more examples.

FIG. 3 depicts vector representation of various vehicles in the perception space and the V2X communication space according to one or more examples. Each vehicle (102) corresponds to a vector $V_X$ 302 in the V2X communication space 304 and a vector $W_X$ 312 in the perception space 314. The magnitude and direction of each vector are based on the values of the various parameters (columns in Table 1, 2). It is understood that the representation of the vectors is exemplary and that the vectors can be represented in various other ways in other examples.

Observer 104 identifies vehicle 102 from the perception space 314 (Table 1) in the V2X communication space 304 (Table 2) by computing a similarity score between vectors 312 in the perception space 314 and the vectors 302 in the V2X communication space 304. The similarity score between a pair of vectors, a first vector $V_X$ 302 (from the V2X communication space 304) and a second vector $W_X$ 312 (from the perception space 314), can be computed as:

$$R(\vec{V_i}, \vec{W_i}) = \frac{\vec{V_i} \otimes \vec{W_i}}{\|\vec{V_i}\| \cdot \|\vec{W_i}\|} = \frac{\sum_{k=1}^{m} v_i^k w_j^k}{\sqrt{\sum_{k=1}^{m} (v_i^k)^2} \sqrt{\sum_{k=1}^{m} (w_j^k)^2}}$$

Here $v_i$ and $w_i$ are the parameters in the first vector $V_X$ 302 and the second vector $W_X$ 312, respectively, where i can take any value up to the number of parameters in the vectors 302, 312.

In one or more examples, particular parameters from the vectors 302, 312, such as the identifier, may not be used for computing the similarity score. If the computed similarity score is above a predetermined threshold, the two vectors 302, 312 are deemed to be for the same vehicle 102. In this manner, for a particular vector $V_X$ 302, the corresponding vector $W_X$ 312 can be identified. Observer 104 can further identify vehicle 102 based on the vector $W_X$ 312.

Subsequently, observer 104 can send the message to vehicle 102 via V2X communication 114, at block 210. For example, once vehicle 102 is identified in the V2X space 304, observer 104 can direct the message to vehicle 102 using the vehicle's 102 communication identifier. Alternatively, or in addition, the vehicle communication identifier can facilitate the observer to determine a communication handle for vehicle 102, for example, an internet protocol (IP) address or any other such messaging identifier. The V2X communication 114 can be performed using a communication module, such as a V2X communication module available from various vendors that facilitates short-range as well as long-range radio communications.

Figure 4:
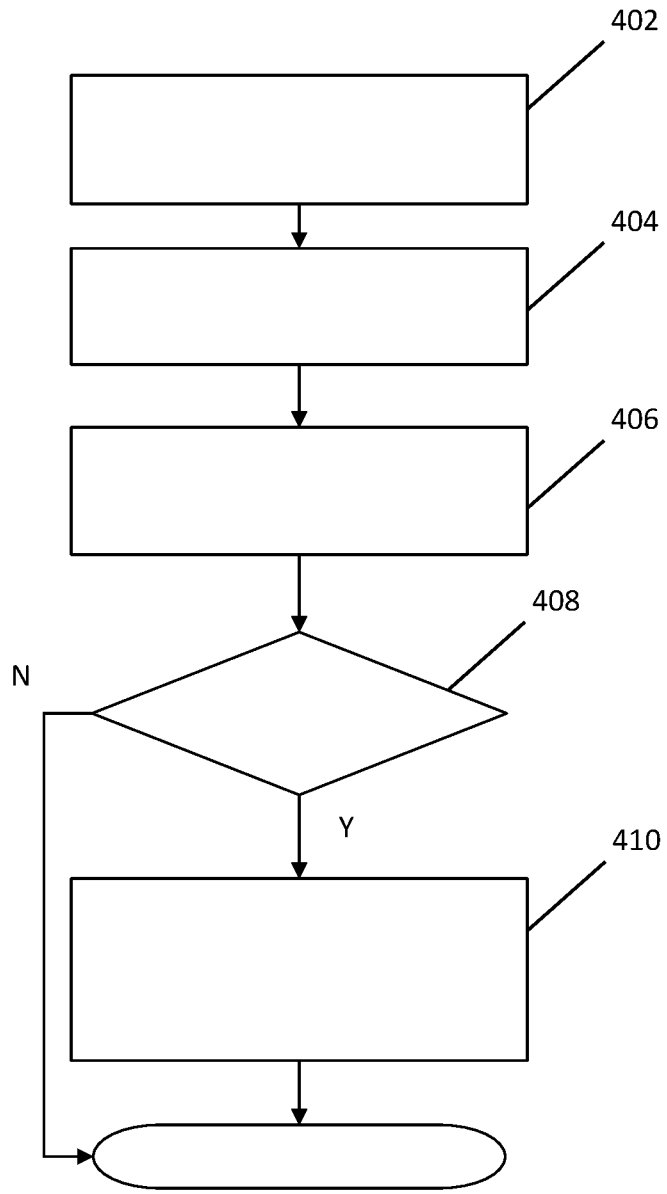
FIG. 4 depicts a flowchart of a method for vehicle to validate an operating condition that is reported by multiple observers according to one or more examples.

FIG. 4 depicts a flowchart of a method 400 for vehicle 102 to validate an operating condition that is reported by observer 104 according to one or more examples. Vehicle 102 receives multiple messages from multiple observers 104, at block 402. For example, consider that vehicle 102 receives K messages (Pi (i=1, . . . , K) from K respective observers 104. Vehicle 102 receives the messages via the V2X communication 114.

The K messages are aggregated to create a synthesized message, at block 404. For example, the synthesized message $M=f_{agg}(\cap_{i=1}^{K}(P_i^{Remote}))$. Accordingly, only the common operating condition reported by the K observers 104 are accumulated in M. In one or more examples, an aggregator module 122 generates the synthesized message M using the remotely received K messages. The aggregation can be varied in different examples. For example, in another example, if the same operating condition is reported in at least a predetermined number (e.g., 3, 5, etc.), or a predetermined proportion (e.g., 60%, 75%, etc.) of the received K messages, the operating condition is included in the synthesized message M.

Further, at block 406, vehicle 102 checks a diagnostic module 120 to check the operating condition (e.g., taillight error/diagnostic trouble (DTC) code). The final synthesized message can be determined as $M=f_{final}(\cap_{i=1}^{K}(P_i^{Remote}), g(P_0^{Local}))$, includes $P^{Local}$ the operating condition(s) reported by the diagnostic module 120 locally in vehicle 120.

If the diagnostic module 120 confirms the operating condition in the synthesized message M, vehicle 102 forwards the message to notify the driver, owner, lessee, or any other user and/or stakeholder associated with the vehicle 102, at blocks 408, 410. The notification can be via an infotainment display (not shown) of vehicle 102. Alternatively, or in addition, the notification can be via an electronic message, such as an email, a text message, an application notification, etc.

Alternatively, if the operating condition is not confirmed by the diagnostic module 120, the operating condition is not reported to the user and/or stakeholder. In other examples, if the diagnostic module 120 is not available, the determination (block 408) is not performed, and the user/stakeholder is notified of the synthesized message M (block 410). In yet other examples, if the same operating condition is reported in at least a predetermined number (e.g., 3, 5, etc.), or a predetermined proportion (e.g., 60%, 75%, etc.) of the received K messages, the user/stakeholder is notified of the operating condition without checking the diagnostic module 120 (block 408).

Figure 5:
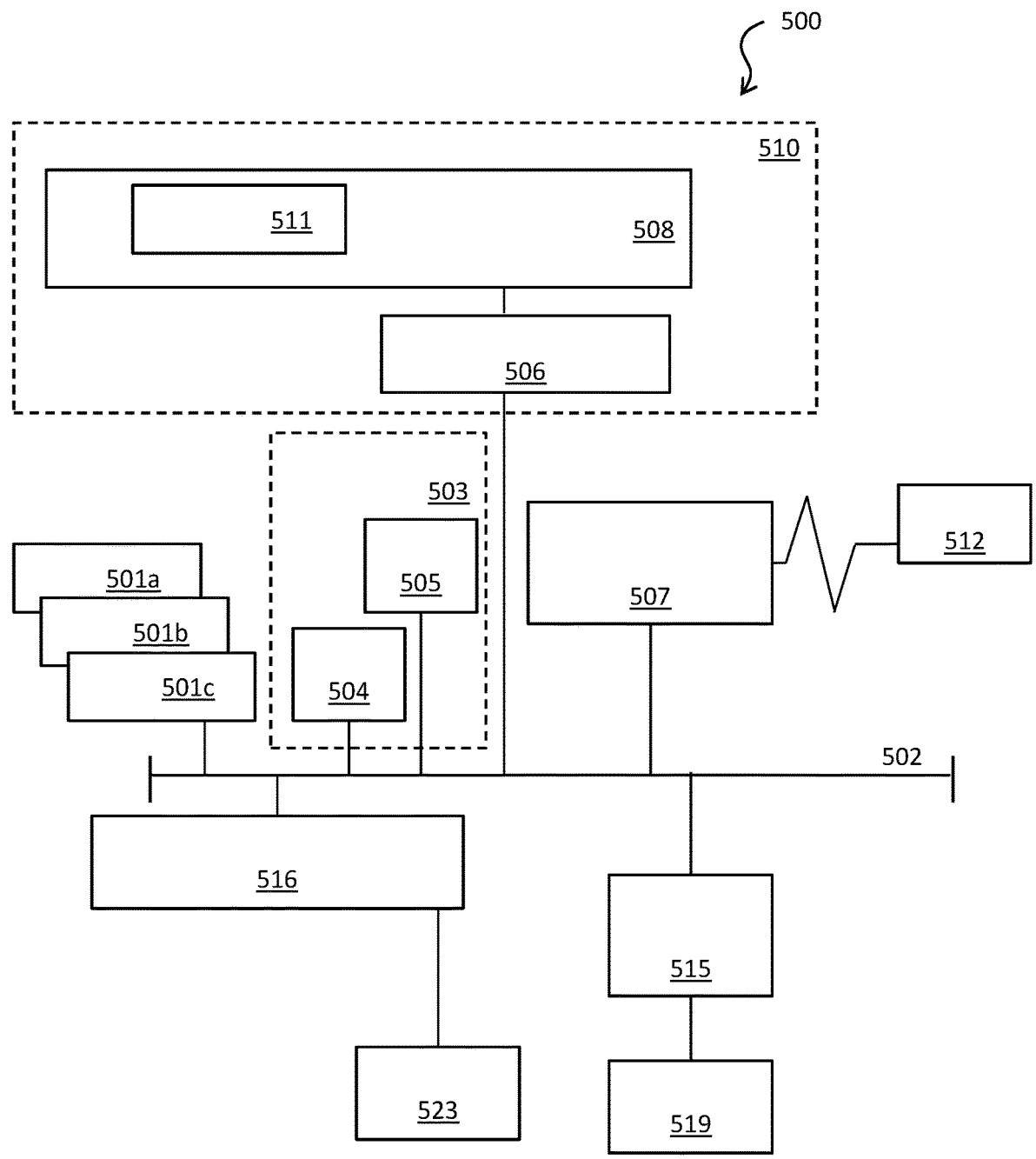
FIG. 5 depicts a computer system according to an example.

Turning now to FIG. 5, a computer system 500 is generally shown in accordance with an example. The computer system 500 can be used for implementing the vehicle controller 106 or any other component used to implement one or more examples of the technical solutions described herein. The computer system 500 can be an electronic computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, a vehicle controller, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to system memory 503 and various other components. The system memory 503 can include a read-only memory (ROM) 504 and random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read-only memory, flash memory, or any other suitable memory system.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system to coordinate the functions of the various components shown.

Additional input/output devices are shown as connected to the system bus 502 via a display adapter 515 and an interface adapter 516. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by the display adapter 515, which may include a graphics controller to improve the performance of graphics-intensive applications and a video controller. A keyboard, a mouse, a touchscreen, one or more buttons, a speaker, etc., can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and storage capability including the system memory 503 and the mass storage 510, input means such as the buttons, touchscreen, and output capability including a speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through network 512. In some examples, an external computing device may be an external web server or a cloud computing node.

It is to be understood that the block diagram of FIG. 5 is not intended to indicate that the computer system 500 is to include all of the components shown. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

Technical solutions described herein facilitate techniques for using V2X communication, an observer vehicle to detect and notify a vehicle about an operating condition and a possible malfunction. The technical solutions described herein facilitate an observer vehicle to identify the same vehicle observed through wireless communication space and through a perception space. Further, the technical solutions described herein facilitate the vehicle to filter and synthesize different inputs from different observer vehicles into a more trustable consensus, which can be reported to a user.

The technical solutions described herein facilitate an observer vehicle to observe the operating conditions of a target vehicle (e.g., headlight or taillight malfunction or other observable events). The observer vehicle provides such information to the target vehicles via V2X communication. The target vehicle might or might not be aware of its own module operating condition. Through crowd-sensing and cross-domain sanity check, the target vehicle can determine if it should notify a user (e.g., operator, dealership, etc.) for further diagnosis/prognosis.

The technical solutions described herein provide improvements to vehicle diagnostics. Further, the technical solutions described herein improve V2X communication by facilitating a vehicle to determine a communication address/handle of another vehicle in its vicinity by comparing a perception space and a vehicle communication space. The technical solutions described herein provide a practical application that improves V2X communication.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope of the application.

What is claimed is:

1. A system comprising:
an observer vehicle; and
a vehicle in a predetermined vicinity of the observer vehicle, wherein the observer vehicle is configured to:
   detect an operating condition of the vehicle using one or more perception devices;
   determine that the operating condition does not satisfy a predetermined norm;
   generate a message indicating the operating condition of the vehicle;
   identify a communication identifier of the vehicle, wherein identifying the communication identifier of the vehicle comprises:
      identifying the vehicle in a vehicle to everything (V2X) space using a first vehicle vector associated with the vehicle, the first vehicle vector being in a perception space and comprising one or more parameters detected by the one or more perception devices; and
      computing a similarity score of the first vehicle vector with a second vehicle vector from the V2X space; and
   send the message to be received by the vehicle using the communication identifier via a V2X communication module.

2. The system of claim 1, wherein the vehicle receives a plurality of messages respectively from a plurality of observer vehicles.

3. The system of claim 2, wherein the vehicle creates a synthesized message by aggregating the plurality of messages, the synthesized message comprising an intersection of one or more operating conditions included in the plurality of messages received.

4. The system of claim 3, wherein the vehicle compares the synthesized message with one or more outputs from a diagnostic module, and in response to the one or more operating conditions in the synthesized message being confirmed by the diagnostic module, providing a notification indicating the one or more operating conditions from the synthesized message.

5. The system of claim 1, wherein the second vehicle vector comprises the one or more parameters received by the V2X communication module.

6. The system of claim 1, wherein the vehicle and the observer vehicle are headed in the same direction.

7. The system of claim 1, wherein the vehicle and the observer vehicle are headed in different directions.

8. The system of claim 1, wherein the operating condition is at least one from a group comprising a malfunctioning light, a misaligned wheel, a misaligned shock absorber, and an open door.

9. A computer-implemented method comprising:
detecting, by an observer vehicle, an operating condition of a vehicle using one or more perception devices in response to the vehicle being within a predetermined vicinity of the observer vehicle;
determining, by the observer vehicle, that the operating condition does not satisfy a predetermined norm;
generating, by the observer vehicle, a message indicating the operating condition of the vehicle;
identifying, by the observer vehicle, a communication identifier of the vehicle, wherein identifying the communication identifier of the vehicle comprises:
   identifying the vehicle in a vehicle to everything (V2X) space using a first vehicle vector associated with the vehicle, the first vehicle vector being in a perception space, and wherein the first vehicle vector comprises one or more parameters detected by the one or more perception devices; and
   computing a similarity score of the first vehicle vector with a second vehicle vector from the V2X space, wherein the second vehicle vector comprises the one or more parameters received by the V2X communication module; and
sending, by the observer vehicle, the message to be received by the vehicle using the communication identifier via a V2X communication module.

10. The computer-implemented method of claim 9, wherein the vehicle receives a plurality of messages respectively from a plurality of observer vehicles, and in response, the vehicle creates a synthesized message by aggregating the plurality of messages, the synthesized message comprising an intersection of one or more operating conditions included in the plurality of messages received.

11. The computer-implemented method of claim 10, wherein the vehicle compares the synthesized message with one or more outputs from a diagnostic module, and in response to the one or more operating conditions in the synthesized message being confirmed by the diagnostic module, the vehicle provides a notification indicating the one or more operating conditions from the synthesized message.

12. The computer-implemented method of claim 9, wherein the operating condition is at least one from a group comprising a malfunctioning light, a misaligned wheel, a misaligned shock absorber, and an open door.

13. A vehicle comprising:
one or more perception devices;
a vehicle to everything (V2X) communication module; and
a vehicle controller that is configured to:
   detect an operating condition of a first vehicle using the one or more perception devices;
   determine that the operating condition does not satisfy a predetermined norm;
   generate a message indicating the operating condition of the first vehicle;
   identify a communication identifier of the first vehicle, wherein identifying the communication identifier of the first vehicle comprises:
      identifying the first vehicle in a V2X space using a first vehicle vector associated with the first vehicle, the first vehicle vector being in a perception space, and wherein the first vehicle vector comprises one or more parameters detected by the one or more perception devices; and
      computing a similarity score of the first vehicle vector with a second vehicle vector from the V2X space, wherein the second vehicle vector comprises the one or more parameters received by the V2X communication module; and
   send the message to be received by the first vehicle using the communication identifier via the V2X communication module.

14. The vehicle of claim 13, wherein the first vehicle receives a plurality of messages respectively from a plurality of vehicles, and the first vehicle creates a synthesized message by aggregating the plurality of messages, the synthesized message comprising an intersection of one or more operating conditions included in the plurality of messages received.

15. The vehicle of claim 14, wherein the first vehicle compares the synthesized message with one or more outputs from a diagnostic module, and in response to the one or more operating conditions in the synthesized message being confirmed by the diagnostic module, the first vehicle provides a notification indicating the one or more operating conditions from the synthesized message.

\* \* \* \* \*